United States Patent [19]

Michel

[11] Patent Number: 4,818,024
[45] Date of Patent: Apr. 4, 1989

[54] TANDEM HOPPER TRAILER

[76] Inventor: John A. Michel, R.R. #2, Blackstock, Ontario, Canada, L0B 1N0

[21] Appl. No.: 178,376

[22] Filed: Apr. 6, 1988

[51] Int. Cl.$^4$ ............................................. B60P 1/56
[52] U.S. Cl. .................................. 298/27; 296/180.1; 296/181; 296/184
[58] Field of Search .................... 298/8 H, 24, 27, 29, 298/30, 31, 32, 33, 34, 35 R, 36; 296/180.4, 181, 183, 184; 105/1.1, 1.2, 1.3, 247, 254, 407, 411; 180/24.02, 209

[56] References Cited

U.S. PATENT DOCUMENTS

| | | |
|---|---|---|
| 2,230,988 | 2/1941 | Alexander ..................... 298/35 R |
| 2,250,262 | 7/1941 | Hill ..................................... 298/24 |
| 2,616,758 | 11/1952 | Meyers ............................. 298/27 X |
| 3,088,774 | 5/1963 | Bernstein et al. ................ 298/27 |
| 3,139,286 | 6/1964 | Johnson ........................... 298/24 X |
| 3,161,418 | 12/1964 | Brennan et al. ................. 180/209 X |
| 3,521,930 | 7/1970 | Tucker ............................ 298/24 |
| 3,815,948 | 6/1974 | Alford ............................. 105/1.3 X |
| 4,165,884 | 8/1979 | Allison et al. ................ 180/24.02 X |
| 4,230,360 | 10/1980 | Eisenman ....................... 298/24 X |
| 4,418,853 | 12/1983 | Shaffer .......................... 296/37.1 X |
| 4,696,238 | 9/1987 | Billingsley et al. ........... 105/411 X |

Primary Examiner—Leslie J. Paperner
Attorney, Agent, or Firm—Ridout & Maybee

[57] ABSTRACT

An on-road hopper trailer has a hopper bin with front and rear walls, a rear ladder frame mounted on at least one axle extending forward to the rear wall of the bin, and a base frame mounted on the ladder frame. The base frame extends about the hopper bin and has four members each extending inwardly from the periphery of the bin. The hopper bin has a rectangular top frame from which a plurality of struts extend to the base and ladder frames to provide sufficient strength and rigidity to the structure.

20 Claims, 4 Drawing Sheets

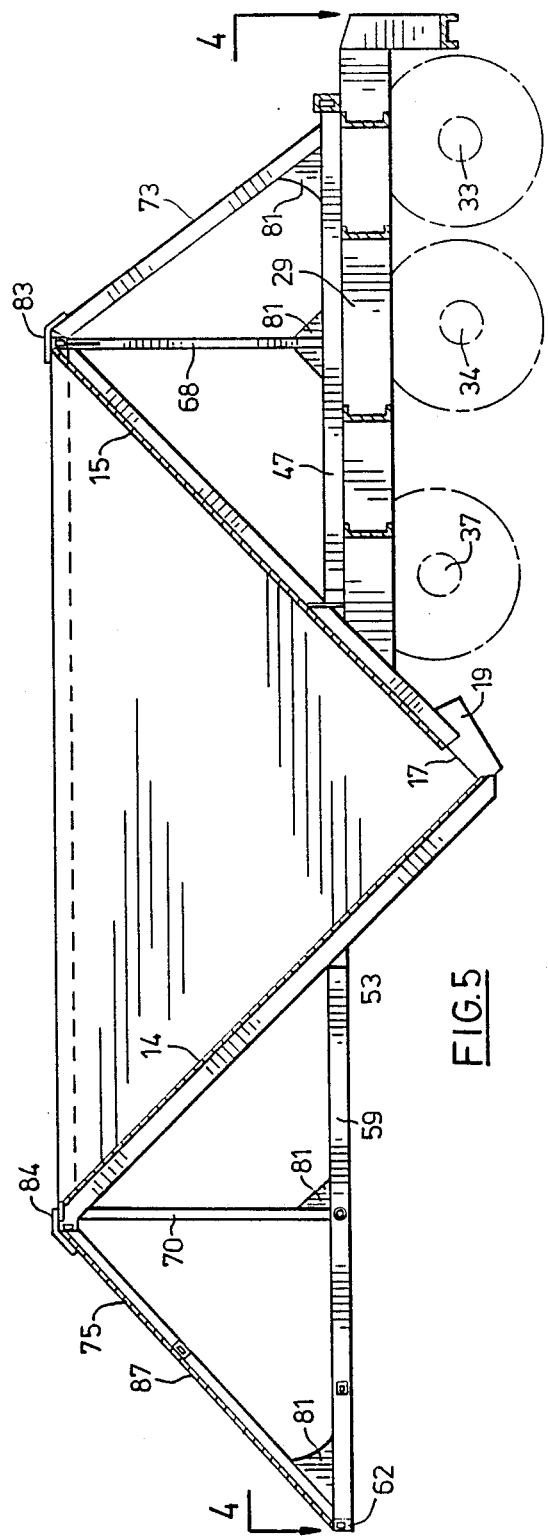

TANDEM HOPPER TRAILER

This is an improved hopper trailer of the kind used in tandem with a truck tractor for road hauling granular materials in bulk.

The economics of today's trucking industry require that payloads be transported in the most efficient manner possible. An important factor in obtaining the highest possible transport efficiency is the maximization of the payload being shipped relative to the tare weight of the shipping vehicle. In the case of transporting granular materials by tractor hopper trailer, it has long been recognized that a significant reduction in the weight of the hopper trailer would result in lower fuel consumption and increased payload during transport, and therefore, provide a competitive advantage.

Initially, this desired weight reduction focused on removing excess weight from body members of the trailer. Thus, upright body side panels having heavy vertical ribbing were changed to horizontally reinforced panels. This change saved significant weight without a loss of sidewall strength for the hopper. A further weight reduction was achieved by removing body panelling from all parts of the trailer where it was not needed for structural reasons. A front sloping panel was retained as a desirable air deflector reducing drag on the trailer when in tow. The removal of these cosmetic body panels exposed frame members of the trailer but resulted in a very desirable weight reduction. A third means of reducing weight was discovered when the lateral side walls of the hopper were each changed from a horizontal rib reinforced structure to a single panel having two horizontal creases in it in place of the ribs. These creased side panels provided acceptable strength to the hopper while weighing less than the prior ribbed structure.

The foregoing weight reduction measures did not involve changes to the structural frame of the hopper trailer in any fundamental way. The bulk of the weight of the trailer has heretofore resided in the massive steel frame and support members provided about the hopper in a generally rectangular box-like arrangement mounted on a standard ladder frame chassis. This box frame structure requires numerous upright and horizontal bracing members to provide the necessary load bearing strength about the hopper. Until the present invention, it was thought not possible to fundamentally alter the frame structure of the standard hopper trailer to reduce the overall frame weight while maintaining the required support strength about the hopper.

Accordingly, the present invention provides an on-road hopper trailer, comprising a hopper bin having generally flat front and rear sloped walls, a rear ladder frame mounted on at least one axle extending forward to the rear wall of the bin, and a base frame mounted on the ladder frame. The base frame extends about the hopper bin and has four members each extending inwardly from the periphery of the bin. The hopper bin has a rectangular top frame from which a plurality of struts extend to the base and ladder frames to provide sufficient strength and rigidity to the structure.

BRIEF DESCRIPTION OF THE DRAWINGS

FIG. 5 is a vertical cross sectional view of the trailer.

Figure 1:
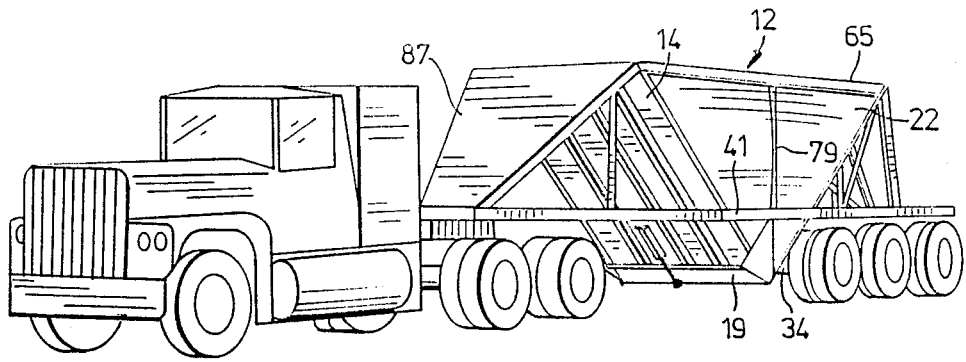
FIG. 1 is a perspective view of the preferred hopper trailer in combination with a truck tractor unit.
Figure 3:
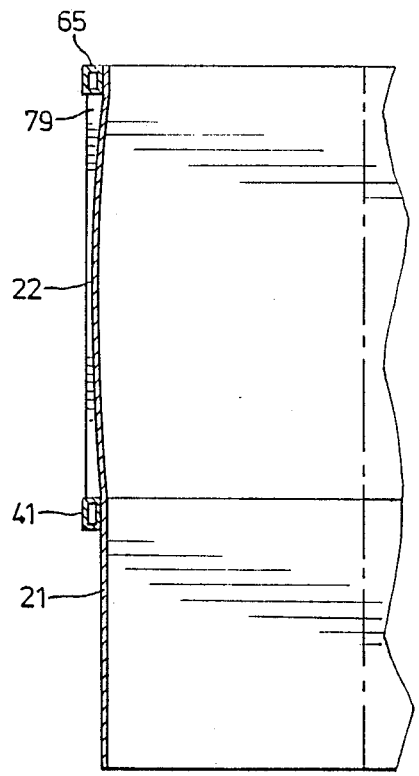
FIG. 3 is a cross section detail showing the curvature of the hopper bin sidewall.

The preferred hopper trailer 10 of the invention has a standard wedge-shaped hopper bin 12 having front and rear flat walls 14 and 15 which are pitched to provide downwardly converging slopes. Preferably, the walls 14 and 15 are pitched at about 40°–45° from vertical to give the bin 12 approximately a right triangular cross section. The walls 14 and 15 meet at the bottom of the bin 12 and define an exit aperture 17 for the hopper bin 12. The exit aperture 17 is of standard design, being formed at the bottom of either the front or the rear wall 14 or 15, and the aperture 17 is provided with a retractable cover means, such as an hydraulically or a pneumatically operated cover plate 19. The triangular side panels 21 of the bin 12 each preferably have an outwardly bulged or convexly curved upper portion 22 (see FIG. 3) which provide a more even lateral distribution of the forces exerted against the panels 21 by a load in the bin 12 than is the case for planar panels 21. The convex curvature applied to the panel portions 22 allows the elimination of additional bracing ribs for the panels 21. However, it should be understood that this curved structure for the side panels 21 is not an essential feature of the invention.

The trailer chassis and support frame for the hopper bin 12 comprise a rear ladder frame 31, comprising a pair of longitudinal parallel legs 29 and transverse braces 30, mounted on two axles 33 and 34 each having four wheels 35. It will be appreciated by those skilled in this art that the number of axles required for the trailer 10 will depend on the size and weight capacity of the trailer 10. In larger versions of the trailer 10, it may be preferable to provide a third retractable axle 37 also having four wheels 35. As shown in FIG. 5, a retractable axle 37 may be provided forward of the axles 33 and 34. This retractable axle 37 provides added weight bearing support for the loaded trailer 10 but is not needed when towing an empty or substantially empty hopper bin 12. Clearly, the retractable axle 37 may also be positioned to the rear of the axles 33 and 34. The ladder frame 31 extends forward to the rear wall 15 of the hopper bin 12 and is attached to it.

A base frame 41 is provided about the hopper bin 12. Preferably, the base frame 41 has a rear member 42 mounted transversely of the ladder frame 31 above the rear axle 33. At the junctions 44 and 45 of the rear member 42 with the ladder frame 31, first side members 47 and 48 extend forwardly and outwardly to the rear side edges 50 and 51 of the hopper bin 12. Parallel second side members 53 and 54 join the first side members 47 and 48 and extend along the side panels 22 of the bin 12 to the forward bin edges 55 and 56. Third side members 59 and 60 are joined to the second side members 53 and 54 and extend forwardly and inwardly preferably to a front member 62 which is parallel to the rear member 42. The front and rear members 62 and 42 are described in relation to the present preferred embodiment, but are not essential features of the invention. The important feature of the base frame 41 is its departure from the traditional rectangular configuration by providing the angled first and third side members 47, 48, 59 and 60. The base frame members are joined together and preferably to the bin 12 along the second side members 53 and 54 to provide with the ladder frame 31 a base support structure for the hopper bin 12. The front portion of the base frame 41 is reinforced with several transverse bracing members 63 extending between the third side members 59 and 60.

A rectangular top frame 65 is attached about the top edge of the hopper bin 12 from which a plurality of struts extend to the base and ladder frames 41 and 31. A-frame struts 68 extend straight down from the rear top frame member 66 to either leg 29 of the ladder frame 31, and a pair of substantially vertical struts 70 extend from the front top frame member 67 to the third side members 59 and 60 of the base frame 41. Rear outer slanted struts 73 preferably extend from junctions 44 and 45 at the rear transverse base member 42 to the ends of the rear top frame member 66. Likewise, front outer slanted struts 75 preferably extend from the ends of the front base member 62 to the ends of the front top frame member 67. The skilled person will appreciate that the exact points of attachment of the front and rear outer struts 75 and 73 to the base frame 41 or to a structure associated with the base frame 41 may vary according to the overall design of the trailer 10. Preferably, the rear strut arrangement also includes a pair of inner slanted struts 77 each of which extends from the junction of a vertical A-frame strut 68 with the top member 66 to a leg 29 of the ladder frame 31. This arrangement in effect provides an extension of the transverse A-frame 66 and 68 in the longitudinal direction. Preferably, a vertical strut 79 is provided along each side panel 22 of the bin 12 between the top and base frames 65 and 41.

As with any trailer to be used in tandem with a truck tractor, the hopper trailer 10 of the invention has means for coupling the front end thereof with the fifth wheel of the tractor, and has retractable legs attached to the base frame 41 beneath the front wall 14 of the hopper bin 12 to provide support for the trailer 10 when it is not attached to a tractor.

From the foregoing description, it should be apparent to the skilled person that the structure according to the invention enables the elimination of many heavy steel components required by previous rectangular framed trailer structures, which in turn results in a trailer 10 weighing several thousand pounds less than prior designs. While the foregoing structure provides the preferred basic assembly for a hopper trailer 10 of the invention, it has been found that reinforcement of key joints is desirable, and in fact, is a practical necessity in order to ensure an acceptable performance of the trailer 10 between reasonably spaced maintenance checks. These reinforcements are provided by means of small steel plates welded about key joints as well as by steel gusset plates welded into corners formed by connecting frame members.

Figure 2:
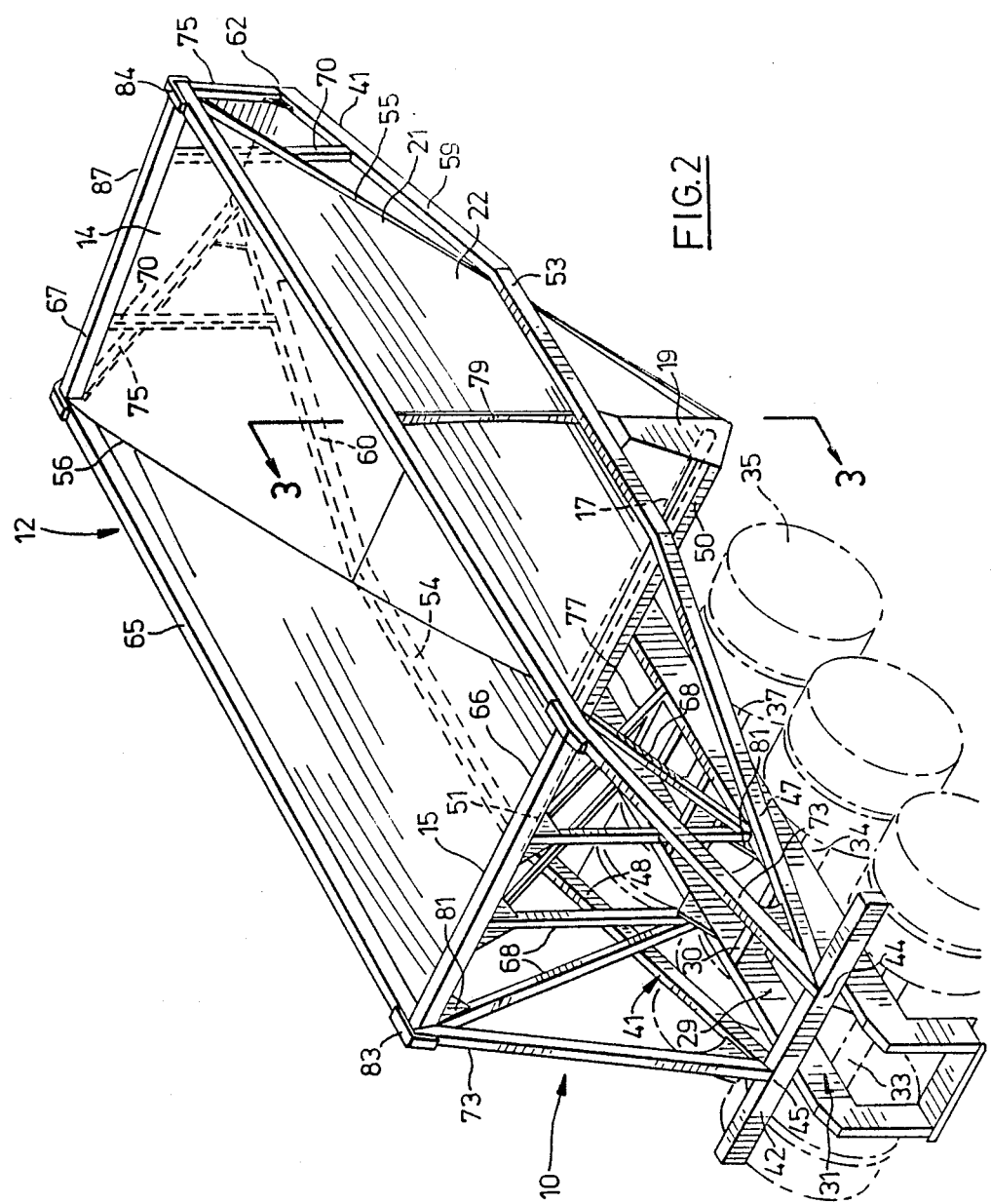
FIG. 2 is a rear perspective view of the trailer.
Figure 4:
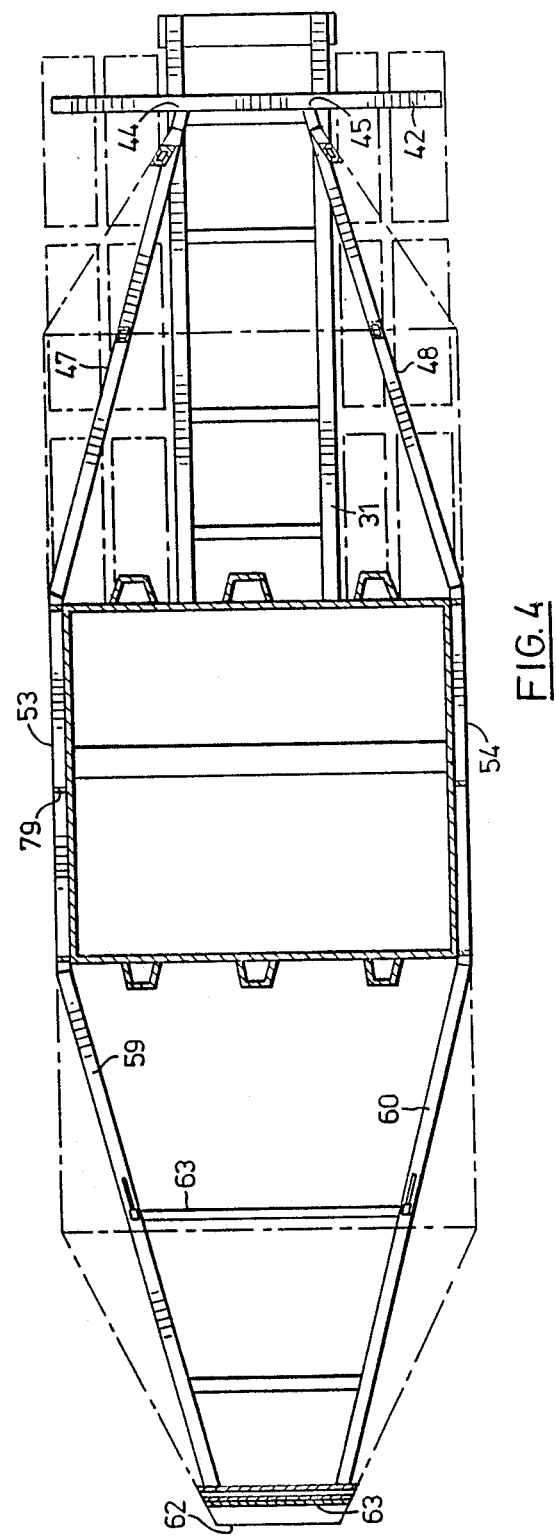
FIG. 4 is a horizontal cross sectional view through line 4—4 in FIG. 5.

Examples of these reinforcing members are illustrated in FIGS. 2 and 5 where gusset plates 81 are provided between the struts and frame members adjacent their junctions. A reinforcing plate 83 is provided over the joint where each rear outer struts 73 is attached to the top rear frame member 66. Similarly, reinforcing plates 84 are provided over the corresponding joints at the top front frame member 67.

The frame structure for the trailer 10 must provide sufficient strength and rigidity to support the anticipated loads to be transported, while also permitting a degree of flexibility to accommodate normal twisting and vibration encountered during road transport. These compromises between rigidity and flexibility, strength and overall weight, are addressed by providing the aforementioned gusset plates 81 and reinforcing plates 83 at key points about the structure. As shown in the drawings, it is preferred to provide gusset plates 81 at all joints of the struts 68, 70, 73, 75 and 77 with frame members. Reinforcing plates 83 are preferably provided about the attachment of the struts 73 and 75 to the top frame 65.

From aerodynamic considerations, it is preferred to cover the front outer struts 75 with a relatively light weight planar panel 87. The front panel 87 provides a surface which deflects air over the trailer 10 thereby reducing drag. The added weight of the panel 87 is considered to be more than compensated for by this aerodynamic benefit.

While the foregoing description relates to a preferred embodiment of the invention, it will be appreciated by those skilled in the art that the principles exemplified by the preferred structure may be varied within the scope of the invention which is defined by the following claims.

I claim:

1. An on-road hopper trailer, comprising:
   a hopper bin having generally flat front and rear walls each being pitched relative to the vertical so that the walls downwardly converge and meet at the bottom of the bin defining an exit aperture for the bin, and said bin having triangular side panels;
   retractable cover means for the exit aperture of the bin;
   a rear ladder frame mounted on at least one axle, the ladder frame extending forward and being attached to the rear wall of the hopper;
   a base frame provided about the bin and being mounted on the ladder frame, the base frame comprising two first side members each extending forwardly and outwardly to two parallel second side members each extending along a side panel of the hopper bin to two third side members each extending forwardly and inwardly;
   a rectangular top frame attached about the top of the hopper bin; and
   a plurality of struts attached to and extending from the top frame to the base and ladder frames, thereby forming a support structure for the bin, said struts comprising two rear inner slanted struts each extending from the top frame to a leg of the ladder frame at a point thereon not directly beneath the top frame.

2. A hopper trailer as claimed in claim 1, wherein each bin side panel has an outwardly convexly curved upper portion defined between the top and base frames.

3. A hopper trailer as claimed in claim 1, wherein the front and rear walls of the bin are pitched at an angle of about 45°.

4. A hopper trailer as claimed in claim 1, wherein the ladder frame has two parallel longitudinal legs connected to one another by a plurality of transverse brace members.

5. A hopper trailer as claimed in claim 1, wherein the ladder frame is mounted on two rear axles.

6. A hopper trailer as claimed in claim 1, wherein the ladder frame is mounted on two rear axles and the trailer is provided with a third retractable axle mounted beneath the ladder frame.

7. A hopper trailer as claimed in claim 1, wherein the base frame further comprises a rear member mounted transversely of the ladder frame, the two first side members extending forwardly from the rear member, and a front member being parallel to the rear member, the two third side members extending forwardly to the front member.

8. A hopper trailer as claimed in claim 7, wherein the two first side members extend forwardly and outwardly from the junction areas of the rear member with the ladder frame, and the third side members extend forwardly and inwardly to either end of the front member.

9. A hopper trailer as claimed in claim 1, wherein the second side members of the base frame are attached to the hopper bin substantially along the entire length of each said member.

10. A hopper trailer as claimed in claim 1, further comprising a plurality of brace members extending transversely between and attached to the third side members of the base frame.

11. A hopper trailer as claimed in claim 1, wherein said struts comprise two sets of A-frame struts extending from a rear transverse top frame member to the ladder frame.

12. A hopper trailer as claimed in claim 11, wherein each set of A-frame struts consists of a substantially vertical strut extending from the rear top frame member to a leg of the ladder frame and an angled strut extending from the near rear corner of the top frame to the junction of the vertical strut and ladder frame leg.

13. A hopper trailer as claimed in claim 1, wherein said struts comprise a pair of substantially vertical struts each extending from a front transverse top frame member to a third side member of the base frame.

14. A hopper trailer as claimed in claim 1, wherein said struts comprise a pair of rear and a pair of front outer slanted struts, each rear slanted strut extending from a rear corner of the top frame downwardly and rearwardly to the base frame, and each front slanted strut extending from a front corner of the top frame downwardly and forwardly to the base frame.

15. A hopper trailer as claimed in claim 7, wherein said struts comprise a pair of rear and a pair of front outer slanted struts, each rear slanted strut extending from a rear corner of the top frame to the nearest rear corner of the base frame and each front slanted strut extending from a front corner of the top frame to the nearest front corner of the base frame.

16. A hopper trailer as claimed in claim 14, wherein each front slanted strut extends downwardly and forwardly from a front corner of the top frame to a point on the nearest third side member spaced from the front member.

17. A hopper trailer as claimed in claim 1, wherein said struts comprise a vertical strut positioned centrally along each side of the hopper bin, each strut extending from the top frame to the base frame.

18. A hopper trailer as claimed in claim 1, further comprising a plurality of gusset plates attached to frame members and struts about their junctions.

19. A hopper trailer as claimed in claim 1, further comprising reinforcing plates attached over the junctions of the struts at the corners of the top frame.

20. A hopper trailer as claimed in claim 1, further comprising a slanted front panel attached to and extending from the front of the top frame downwardly and forwardly to the front member of the base frame.

* * * * *